United States Patent
Tian

(10) Patent No.: US 8,885,650 B2
(45) Date of Patent: Nov. 11, 2014

(54) METHOD, APPARATUS AND SYSTEM FOR PROCESSING A TUNNEL PACKET

(71) Applicant: Huawei Technologies Co., Ltd., Shenzhen (CN)

(72) Inventor: Xiangyuan Tian, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 13/686,327

(22) Filed: Nov. 27, 2012

(65) Prior Publication Data

US 2013/0329733 A1 Dec. 12, 2013

(30) Foreign Application Priority Data

Nov. 30, 2011 (CN) .......................... 2011 1 0389411

(51) Int. Cl.
- *H04L 12/28* (2006.01)
- *H04L 1/00* (2006.01)
- *H04L 12/46* (2006.01)

(52) U.S. Cl.
CPC .......... *H04L 1/0083* (2013.01); *H04L 12/4633* (2013.01)
USPC .......................................... 370/394; 370/474

(58) Field of Classification Search
USPC .................. 370/389–394, 395.1, 473, 474
See application file for complete search history.

(56) References Cited

U.S. PATENT DOCUMENTS

| 2002/0131414 A1 | 9/2002 | Hadzic |
| 2005/0243834 A1 | 11/2005 | Fukuda |
| 2009/0067429 A1 | 3/2009 | Nagai et al. |
| 2012/0155460 A1* | 6/2012 | Gu et al. ................ 370/389 |

FOREIGN PATENT DOCUMENTS

EP 2323342 A1 5/2011

OTHER PUBLICATIONS

Extended European Search Report issued in corresponding European Patent Application No. 12193319.6, mailed Feb. 1, 2013.
Cisco, "MTU Tuning for L2TP" Document ID 24320, Jun. 22, 2005.

* cited by examiner

*Primary Examiner* — Dady Chery
(74) *Attorney, Agent, or Firm* — Brinks Gilson & Lione

(57) ABSTRACT

Embodiments of the present invention disclose a method, an apparatus and a system for processing a tunnel packet. When a tunnel ingress device performs tunnel encapsulation on a data packet, a dynamic identifier is included in an encapsulated packet header, so that each tunnel-encapsulated data packet has a different triplet. In this way, when the tunnel-encapsulated data packet is fragmented, a tunnel egress device may correctly reassemble the tunnel-encapsulated data packet according to the triplet of the fragmented packet.

4 Claims, 2 Drawing Sheets

| 4-bit version | 4-bit header length | 8-bit type of service (TOS) | 16-bit total length | |
|---|---|---|---|---|
| 16-bit dynamic identifier | | | 3-bit flag | 13-bit fragment offset |
| 8-bit time to live (TTL) | 8-bit protocol | | 16-bit header checksum | |
| 32-bit source IP address | | | | |
| 32-bit destination IP address | | | | |

METHOD, APPARATUS AND SYSTEM FOR PROCESSING A TUNNEL PACKET

CROSS-REFERENCE TO RELATED APPLICATION

This application claims priority to Chinese Patent Application No. 201110389411.0, filed on Nov. 30, 2011, which is hereby incorporated by reference in its entirety.

FIELD

The present invention relates to the field of network communications, and in particular, to a method, an apparatus and a system for processing a tunnel packet.

BACKGROUND

A tunneling technology is a manner of transferring data between networks through Internet infrastructure, and the data transferred by using a tunnel may be a data frame or a data package of different protocols. The tunneling technology obtains a tunnel packet by encapsulating a tunnel packet header on an outer layer of the data frame or data package of different protocols on a tunnel ingress device, and forwards the tunnel packet between devices at two ends of the tunnel through a public Internet. Once the tunnel packet arrives at an egress device of the tunnel, the tunnel packet is decapsulated and forwarded to a final destination. In a whole transfer process, a logical path through which the tunnel packet is transferred in the public Internet is referred to as the tunnel. The tunneling technology is a whole process including encapsulation, transmission and decapsulation of the data.

However, compared with the original data frame or data package, length of the tunnel packet is increased. When forwarded in the tunnel, if a MTU of an intermediate link of the tunnel is smaller than the tunnel packet, the tunnel packet is fragmented. Fragmented packets need to be reassembled when arriving at a tunnel egress device after being forwarded, so as to obtain the complete tunnel packet and then perform tunnel decapsulation. Generally, when the fragmented packets are reassembled, an associated fragmented packet is identified according to a triplet formed of a source Internet Protocol (Internet Protocol, IP for short) address, a destination IP address and an identifier in the packet header. Because tunnel packets forwarded by the same tunnel are all added with the same tunnel packet header, their triplets are the same, so that when the fragmented packets are reassembled, the associated fragmented packet cannot be correctly identified. Therefore, when the fragmented packets are reassembled, mismatching is generated, resulting in an error tunnel packet.

SUMMARY

Embodiments of the present invention provide a method, an apparatus and a system for processing a tunnel packet, so as to solve an existing problem that when a tunnel-encapsulated packet is fragmented, mismatching is generated in reassemble, resulting in an error tunnel packet.

The present invention provides a method for processing a tunnel packet, including:
receiving, by a tunnel ingress device, a data packet;
obtaining a dynamic identifier;
performing tunnel encapsulation on the data packet, where the tunnel-encapsulated packet header includes an Internet Protocol IP address of the tunnel ingress device, an IP address of a tunnel egress device, and the dynamic identifier; and
sending the tunnel-encapsulated data packet, so that when the tunnel-encapsulated data packet is fragmented, the tunnel egress device may correctly reassemble the tunnel-encapsulated data packet according to the IP address of the tunnel ingress device, the IP address of the tunnel egress device, and the dynamic identifier.

The present invention provides an apparatus for processing a tunnel packet, including:
a receiver, configured to receive a data packet;
an obtaining unit, configured to obtain a dynamic identifier;
an encapsulating unit, configured to perform tunnel encapsulation on the data packet, where the tunnel-encapsulated packet header includes an Internet Protocol IP address of a tunnel ingress device, an IP address of a tunnel egress device, and the dynamic identifier; and
a sender, configured to send the tunnel-encapsulated data packet, so that when the tunnel-encapsulated data packet is fragmented, the tunnel egress device may correctly reassemble the tunnel-encapsulated data packet according to the IP address of the tunnel ingress device, the IP address of the tunnel egress device, and the dynamic identifier.

The present invention provides a system for processing a tunnel packet, including a tunnel ingress device and a tunnel egress device, where:
the tunnel ingress device is configured to receive a data packet, obtain a dynamic identifier, perform tunnel encapsulation on the data packet, where the tunnel-encapsulated packet header includes an Internet Protocol IP address of the tunnel ingress device, an IP address of the tunnel egress device, and the dynamic identifier, and send the tunnel-encapsulated data packet; and
the tunnel egress device is configured to receive the tunnel-encapsulated data packet, and when the tunnel-encapsulated data packet is fragmented, reassemble the tunnel-encapsulated data packet according to the IP address of the tunnel ingress device, the IP address of the tunnel egress device, and the dynamic identifier.

With the technical solutions provided in the embodiments of the present invention, when the tunnel ingress device performs the tunnel encapsulation on the data packet, the dynamic identifier is included in the encapsulated packet header, so that each tunnel-encapsulated data packet has a different triplet. In this way, when the tunnel-encapsulated data packet is fragmented, the tunnel egress device may correctly reassemble the tunnel-encapsulated data packet according to the triplet of the fragmented packet.

DETAILED DESCRIPTION OF THE EMBODIMENTS

In order to make the objectives, characteristics and advantages of embodiments of the present invention more obvious and comprehensible, the embodiments of the present invention are further illustrated in detail in the following with reference to the accompanying drawings and specific implementation manners.

Figures 1, 2:
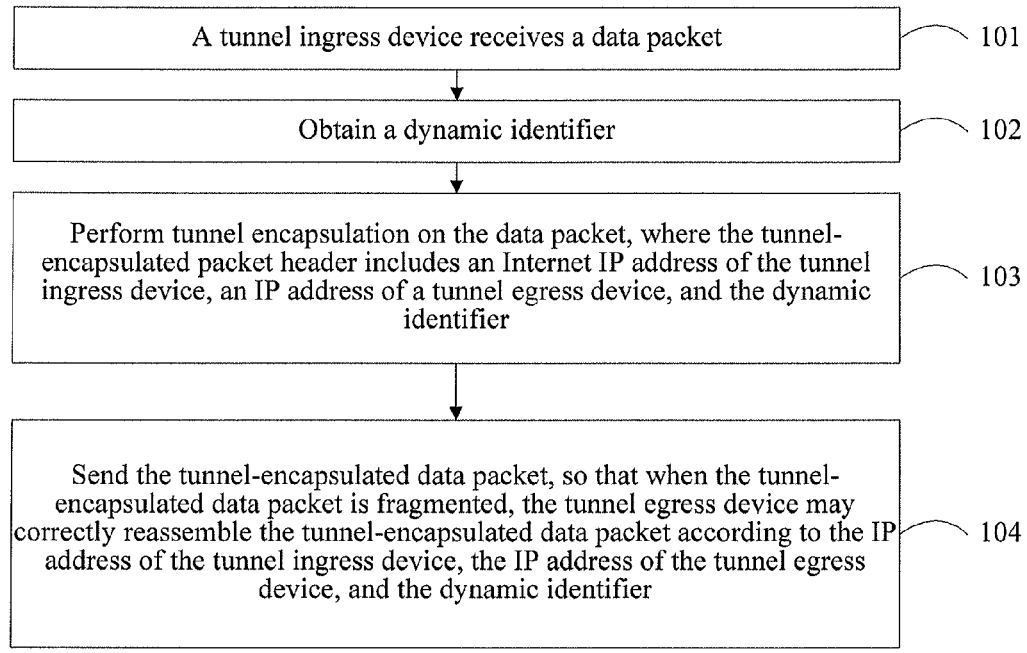
FIG. 1 is a flow chart of a method for processing a tunnel packet according to an embodiment of the present invention.
FIG. 2 is a schematic diagram of a tunnel encapsulation header according to an embodiment of the present invention.

Referring to FIG. 1, it is a flow chart of a method for processing a tunnel packet according to an embodiment of the present invention. The method includes:

101: A tunnel ingress device receives a data packet.

General tunneling technologies include generic routing encapsulation (Generic Routing Encapsulation, GRE for short), a layer 2 tunneling protocol (Layer 2 Tunneling Protocol, L2TP for short) or Internet protocol security (Internet Protocol Security, IPSec for short), and so on.

The tunnel ingress device may be a router, or a switch, and so on.

102: Obtain a dynamic identifier;

The dynamic identifier may be a time stamp, an integer changing according to a quantity rule, such as an ascending or descending integer, or a random number.

For example, when receiving the data packet, the tunnel ingress device extracts the time stamp of system and uses the time stamp as the dynamic identifier.

103: Perform tunnel encapsulation on the data packet, where the tunnel-encapsulated packet header includes an Internet Protocol IP address of the tunnel ingress device, an IP address of a tunnel egress device, and the dynamic identifier.

The tunnel ingress device adds the tunnel-encapsulated packet header to outer layer of the data packet, and performs the tunnel encapsulation on the data packet.

For example, as shown in FIG. 2, it is a schematic diagram of a tunnel encapsulation header according to an embodiment of the present invention. The tunnel encapsulation header is an IP packet header, where it includes the dynamic identifier.

104: Send the tunnel-encapsulated data packet.

The tunnel ingress device sends the tunnel-encapsulated data packet to the tunnel egress device, so that when the tunnel-encapsulated data packet is fragmented, the tunnel egress device may correctly reassemble the tunnel-encapsulated data packet according to the IP address of the tunnel ingress device, the IP address of the tunnel egress device, and the dynamic identifier.

According to the technical solution provided in the embodiment of the present invention, when the tunnel ingress device performs the tunnel encapsulation on the data packet, the encapsulated packet header includes the dynamic identifier. Therefore, each tunnel-encapsulated data packet has a different triplet. In this way, when the tunnel-encapsulated data packet is fragmented, the tunnel egress device may correctly reassemble the tunnel-encapsulated data packet according to the triplet of the fragmented packet, thereby solving an existing problem that when the tunnel-encapsulated packet is fragmented, mismatching is generated in reassemble, resulting in an error tunnel packet.

Figure 3:
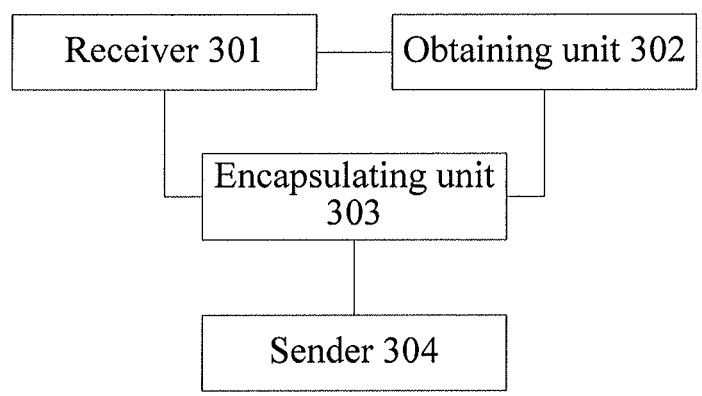
FIG. 3 is a block diagram of an apparatus for processing a tunnel packet according to an embodiment of the present invention.

Referring to FIG. 3, it is a block diagram of an apparatus for processing a tunnel packet according to an embodiment of the present invention. The apparatus includes a receiver 301, an obtaining unit 302, an encapsulating unit 303 and a sender 304, where:

the receiver 301 is configured to receive a data packet;

the obtaining unit 302 is configured to obtain a dynamic identifier;

the encapsulating unit 303 is configured to perform tunnel encapsulation on the data packet, where the tunnel-encapsulated packet header includes an Internet Protocol IP address of a tunnel ingress device, an IP address of a tunnel egress device, and the dynamic identifier; and the sender 304 is configured to send the tunnel-encapsulated data packet, so that when the tunnel-encapsulated data packet is fragmented, the tunnel egress device may correctly reassemble the tunnel-encapsulated data packet according to the IP address of the tunnel ingress device, the IP address of the tunnel egress device, and the dynamic identifier.

The dynamic identifier may be a time stamp, an integer changing according to a quantity rule, such as an ascending or descending integer, or a random number.

For example, when receiving the data packet, the apparatus generates a non-repeating random number according to a random function, and uses the random number as the dynamic identifier.

The encapsulating unit 303 adds the tunnel-encapsulated packet header to outer layer of the data packet, and performs the tunnel encapsulation on the data packet.

For example, as shown in FIG. 2, it is a schematic diagram of a tunnel encapsulation header according to an embodiment of the present invention. The tunnel encapsulation header is an IP packet header, where it includes the dynamic identifier.

The sender 304 sends the tunnel-encapsulated data packet to the tunnel egress device, so that when the tunnel-encapsulated data packet is fragmented, the tunnel egress device can correctly reassemble the tunnel-encapsulated data packet according to the IP address of the tunnel ingress device, the IP address of the tunnel egress device, and the dynamic identifier.

According to the technical solution provided in the embodiment of the present invention, when the tunnel ingress device performs the tunnel encapsulation on the data packet, the encapsulated packet header includes the dynamic identifier. Therefore, each tunnel-encapsulated data packet has a different triplet. In this way, when the tunnel-encapsulated data packet is fragmented, the tunnel egress device may correctly reassemble the tunnel-encapsulated data packet according to the triplet of the fragmented packet, thereby solving an existing problem that when the tunnel-encapsulated packet is fragmented, mismatching is generated in reassemble, resulting in an error tunnel packet.

Figure 4:
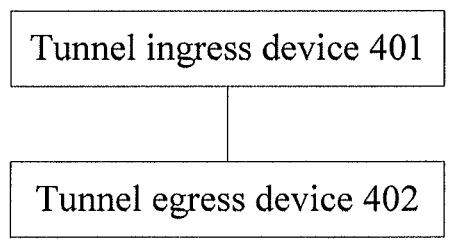
FIG. 4 is a block diagram of a system for processing a tunnel packet according to an embodiment of the present invention.

Referring to FIG. 4, it is a block diagram of a system for processing a tunnel packet according to an embodiment of the present invention. The system includes a tunnel ingress device 401 and a tunnel egress device 402, where:

the tunnel ingress device 401 is configured to receive a data packet, obtain a dynamic identifier, perform tunnel encapsulation on the data packet, where the tunnel-encapsulated packet header includes an Internet Protocol IP address of the tunnel ingress device, an IP address of the tunnel egress device, and the dynamic identifier, and send the tunnel-encapsulated data packet; and the tunnel egress device 402 is configured to receive the tunnel-encapsulated data packet, and when the tunnel-encapsulated data packet is fragmented, reassemble the tunnel-encapsulated data packet according to the IP address of the tunnel ingress device, the IP address of the tunnel egress device, and the dynamic identifier.

The tunnel ingress device 401 and the tunnel egress device 402 may be routers, or switches, and so on.

The dynamic identifier may be a time stamp, an integer changing according to a quantity rule, such as an ascending or descending integer, or a random number.

For example, when receiving the data packet, the tunnel ingress device extracts the time stamp of system and uses the time stamp as the dynamic identifier.

With the technical solution provided in the embodiment of the present invention, when the tunnel ingress device performs the tunnel encapsulation on the data packet, the encapsulated packet header includes the dynamic identifier. Therefore, each tunnel-encapsulated data packet has a different triplet. In this way, when the tunnel-encapsulated data packet is fragmented, the tunnel egress device may correctly reassemble the tunnel-encapsulated data packet according to the triplet of the fragmented packet, thereby solving an existing problem that when the tunnel-encapsulated packet is fragmented, mismatching is generated in reassemble, resulting in an error tunnel packet.

Persons of ordinary skill in the art may understand that all or part of the steps in the method according to the foregoing embodiments of the present invention may be implemented by a program instructing relevant hardware. The program may be stored in a computer readable storage medium. The storage medium may be a ROM/RAM, a magnetic disk, or a compact disk, and so on.

The foregoing descriptions are merely exemplary implementation manners of the present invention, but the protection scope of the present invention is not limited here. Any modification or replacement that may be easily thought of by persons skilled in the art without departing from the technical scope disclosed in the present invention shall fall within the protection scope of the present invention. Therefore, the protection scope of the present invention is subject to the protection scope of the claims.

What is claimed is:

1. A method for identifying each tunnel packet forwarded by one tunnel between a tunnel ingress device and a tunnel egress device, comprising:

receiving, by the tunnel ingress device, a data packet to be forward by the tunnel;

obtaining a dynamic identifier for uniquely identifying the data packet from other data packets forwarded by the tunnel, wherein the dynamic identifier is a time stamp or a random number generated according to a random function;

performing tunnel encapsulation on the data packet by adding an tunnel-encapsulated packet header to outer layer of the data packet, wherein the tunnel-encapsulated packet header includes a triplet to make each tunnel-encapsulated data packet forwarded by the tunnel has a different triplet, the triplet comprises an Internet Protocol (IP) address of the tunnel ingress device, an IP address of the tunnel egress device, and the dynamic identifier; and sending the tunnel-encapsulated data packet, so that when the tunnel-encapsulated data packet is fragmented, the tunnel egress device may correctly reassemble the tunnel-encapsulated data packet according to the triplet.

2. An apparatus for identifying each tunnel packet forwarded by one tunnel between a tunnel ingress device and a tunnel egress device, comprising:

a receiver, configured to receive a data packet to be forward by the tunnel;

an obtaining unit, configured to obtain a dynamic identifier for uniquely identifying the data packet from other data packets forwarded by the tunnel, wherein the dynamic identifier is a time stamp or a random number generated according to a random function;

an encapsulating unit, configured to perform tunnel encapsulation on the data packet by adding an tunnel-encapsulated packet header to outer layer of the data packet, wherein the tunnel-encapsulated packet header includes a triplet to make each tunnel-encapsulated data packet forwarded by the tunnel has a different triplet, the triplet comprises an Internet Protocol IP address of a tunnel ingress device, an IP address of a tunnel egress device, and the dynamic identifier; and a sender, configured to send the tunnel-encapsulated data packet, so that when the tunnel-encapsulated data packet is fragmented, the tunnel egress device may correctly reassemble the tunnel-encapsulated data packet according to the triplet.

3. A system for processing a tunnel packet, comprising: a tunnel ingress device and a tunnel egress device, wherein the tunnel ingress device is configured to receive a data packet to be forward by one tunnel between the tunnel ingress device and the tunnel egress device, obtain a dynamic identifier for uniquely identifying the data packet from other data packets forwarded by the tunnel, perform tunnel encapsulation on the data packet by adding an tunnel-encapsulated packet header to outer layer of the data packet, and send the tunnel-encapsulated data packet, wherein the tunnel-encapsulated packet header includes a triplet to make each tunnel-encapsulated data packet forwarded by the tunnel has a different triplet, the triplet comprises an Internet Protocol IP address of the tunnel ingress device, an IP address of the tunnel egress device, and the dynamic identifier, and send the tunnel-encapsulated data packet, and the dynamic identifier is a time stamp or a random number generated according to a random function; and the tunnel egress device is configured to receive the tunnel-encapsulated data packet and when the tunnel-encapsulated data packet is fragmented to multiple fragments, reassemble the multiple fragments to the tunnel-encapsulated data packet according to the triplet.

4. A computer program product for use in an tunnel ingress device, the computer program product being stored on a non-transitory computer readable medium and including computer executable instructions that when executed by processor cause the tunnel ingress device to perform the following:

receive a data packet to be forward by one tunnel between the tunnel ingress device and a tunnel egress device;

obtain a dynamic identifier for uniquely identifying the data packet from other data packets forwarded by the tunnel, wherein the dynamic identifier is a time stamp or a random number generated according to a random function;

perform tunnel encapsulation on the data packet by adding an tunnel-encapsulated packet header to outer layer of the data packet, wherein the tunnel-encapsulated packet header includes a triplet to make each tunnel-encapsulated data packet forwarded by the tunnel has a different triplet, the triplet comprises an Internet Protocol (IP) address of the tunnel ingress device, an IP address of the tunnel egress device, and the dynamic identifier; and send the tunnel-encapsulated data packet, so that when the tunnel-encapsulated data packet is fragmented, the tunnel egress device may correctly reassemble the tunnel-encapsulated data packet according to the triplet.

* * * * *